United States Patent [19]

Liu

[11] 4,145,644
[45] Mar. 20, 1979

[54] DUAL STEPPING ANGLE STEPPER MOTOR DRIVE

[75] Inventor: Raymond C. Liu, Norwalk, Conn.

[73] Assignee: The Perkin-Elmer Corporation, Norwalk, Conn.

[21] Appl. No.: 811,738

[22] Filed: Jun. 30, 1977

[51] Int. Cl.² ........................................... H02K 37/00
[52] U.S. Cl. .................................................... 318/696
[58] Field of Search ................................. 318/685, 696

[56] References Cited

U.S. PATENT DOCUMENTS

| | | | |
|---|---|---|---|
| 3,746,958 | 7/1973 | Leenhouts | 318/696 |
| 3,809,990 | 5/1974 | Kuo et al. | 318/696 |
| 3,838,258 | 9/1974 | Logan | 318/696 X |
| 3,963,971 | 6/1976 | | Leenhouts et al./318 |

Primary Examiner—Gene Z. Rubinson

Attorney, Agent, or Firm—Salvatore A. Girratana; Francis L. Masselle; John D. Crane

[57] ABSTRACT

A stepping motor control circuit permitting selective operation of the motor in various modes such as half or full step mode. The circuit includes a pulse generator producing pulses at a selected motor step rate. A switch means selects the step size while a second switch selects the motor direction. An up/down counter counts pulses from the pulse generator in a direction correlated with the selected rotation direction. A read-only-memory is addressed as a function of the periodically repeating count in the up/down counter and the selected step size. The stored information at the addressed read-only-memory location actuates motor drive circuitry which generates energizing signals for the motor windings to drive the motor in the selected direction a distance corresponding to the selected step size at a step rate equal to the pulse rate of the pulse generator.

15 Claims, 14 Drawing Figures

| MEMORY LOCATION | | | | | CONTENTS | | | | | | | |
|---|---|---|---|---|---|---|---|---|---|---|---|---|
| E | D | C | B | A | Y8 | Y7 | Y6 | Y5 | Y4 | Y3 | Y2 | Y1 |
| 0 | 0 | 0 | 0 | 0 | 1 | 1 | 1 | 0 | 0 | 0 | 0 | 1 |
| 0 | 0 | 0 | 0 | 1 | 1 | 1 | 0 | 0 | 0 | 0 | 1 | 1 |
| 0 | 0 | 0 | 1 | 0 | 1 | 0 | 0 | 0 | 0 | 1 | 1 | 1 |
| 0 | 0 | 0 | 1 | 1 | 0 | 0 | 0 | 0 | 1 | 1 | 1 | 1 |
| 0 | 0 | 1 | 0 | 0 | 0 | 0 | 0 | 1 | 1 | 1 | 1 | 0 |
| 0 | 0 | 1 | 0 | 1 | 0 | 0 | 1 | 1 | 1 | 1 | 0 | 0 |
| 0 | 0 | 1 | 1 | 0 | 0 | 1 | 1 | 1 | 1 | 0 | 0 | 0 |
| 0 | 0 | 1 | 1 | 1 | 1 | 1 | 1 | 1 | 0 | 0 | 0 | 0 |
| 0 | 1 | 0 | 0 | 0 | 1 | 1 | 1 | 0 | 0 | 0 | 0 | 1 |
| 0 | 1 | 0 | 0 | 1 | 1 | 1 | 0 | 0 | 0 | 0 | 1 | 1 |
| 0 | 1 | 0 | 1 | 0 | 1 | 0 | 0 | 0 | 0 | 1 | 1 | 1 |
| 0 | 1 | 0 | 1 | 1 | 0 | 0 | 0 | 0 | 1 | 1 | 1 | 1 |
| 0 | 1 | 1 | 0 | 0 | 0 | 0 | 0 | 1 | 1 | 1 | 1 | 0 |
| 0 | 1 | 1 | 0 | 1 | 0 | 0 | 1 | 1 | 1 | 1 | 0 | 0 |
| 0 | 1 | 1 | 1 | 0 | 0 | 1 | 1 | 1 | 1 | 0 | 0 | 0 |
| 0 | 1 | 1 | 1 | 1 | 1 | 1 | 1 | 1 | 0 | 0 | 0 | 0 |

*FIG. 3a*

| COIL | SEQUENCE OF COIL EXCITATION | ROTOR DIRECTION |
|---|---|---|
| L1 | | |
| L2 | | C.C.W. ↓  C.W. ↑ |
| L3 | | |
| L4 | | |
| L5 | | |
| L6 | | |
| L7 | | |
| L8 | | |

HATCHED BLOCKS INDICATE COIL ENERGIZED

*FIG. 3b*

| MEMORY LOCATION | | | | | CONTENTS | | | | | | | |
|---|---|---|---|---|---|---|---|---|---|---|---|---|
| E | D | C | B | A | Y8 | Y7 | Y6 | Y5 | Y4 | Y3 | Y2 | Y1 |
| 1 | 0 | 0 | 0 | 0 | 1 | 1 | 1 | 0 | 0 | 0 | 0 | 1 |
| 1 | 0 | 0 | 0 | 1 | 1 | 1 | 0 | 0 | 0 | 0 | 0 | 1 |
| 1 | 0 | 0 | 1 | 0 | 1 | 1 | 0 | 0 | 0 | 0 | 1 | 1 |
| 1 | 0 | 0 | 1 | 1 | 1 | 0 | 0 | 0 | 0 | 0 | 1 | 1 |
| 1 | 0 | 1 | 0 | 0 | 1 | 0 | 0 | 0 | 0 | 1 | 1 | 1 |
| 1 | 0 | 1 | 0 | 1 | 0 | 0 | 0 | 0 | 0 | 1 | 1 | 1 |
| 1 | 0 | 1 | 1 | 0 | 0 | 0 | 0 | 0 | 1 | 1 | 1 | 1 |
| 1 | 0 | 1 | 1 | 1 | 0 | 0 | 0 | 0 | 1 | 1 | 1 | 0 |
| 1 | 1 | 0 | 0 | 0 | 0 | 0 | 0 | 1 | 1 | 1 | 1 | 0 |
| 1 | 1 | 0 | 0 | 1 | 0 | 0 | 0 | 1 | 1 | 1 | 0 | 0 |
| 1 | 1 | 0 | 1 | 0 | 0 | 0 | 1 | 1 | 1 | 1 | 0 | 0 |
| 1 | 1 | 0 | 1 | 1 | 0 | 0 | 1 | 1 | 1 | 0 | 0 | 0 |
| 1 | 1 | 1 | 0 | 0 | 0 | 1 | 1 | 1 | 1 | 0 | 0 | 0 |
| 1 | 1 | 1 | 0 | 1 | 0 | 1 | 1 | 1 | 0 | 0 | 0 | 0 |
| 1 | 1 | 1 | 1 | 0 | 1 | 1 | 1 | 1 | 0 | 0 | 0 | 0 |
| 1 | 1 | 1 | 1 | 1 | 1 | 1 | 1 | 0 | 0 | 0 | 0 | 0 |

| COIL | SEQUENCE OF COIL EXCITATION | ROTOR DIRECTION |
|---|---|---|
| L1 | ▨▨▨▨▨▨▨▨▨ | |
| L2 |   ▨▨▨▨▨▨▨▨▨ | |
| L3 |     ▨▨▨▨▨▨▨▨▨ | |
| L4 |       ▨▨▨▨▨▨▨▨▨ |  |
| L5 |         ▨▨▨▨▨▨▨▨▨ | |
| L6 | ▨          ▨▨▨▨▨▨▨▨ | |
| L7 | ▨▨▨          ▨▨▨ | |
| L8 | ▨▨▨▨▨         ▨ | |

HATCHED BLOCKS INDICATE COIL ENERGIZED

| MEMORY LOCATION | CONTENTS | |
| --- | --- | --- |
| | ROM 2 | ROM 1 |
| E D C B A | Y8 Y7 Y6 Y5 Y4 Y3 Y2 Y1 | Y8 Y7 Y6 Y5 Y4 Y3 Y2 Y1 |
| 0 0 0 0 0 | 0 0 0 0 0 0 0 0 | 0 0 0 0 0 0 0 1 |
| 0 0 0 0 1 | 0 0 0 0 0 0 0 0 | 1 0 0 0 0 0 1 0 |
| 0 0 0 1 0 | 0 0 0 0 0 0 0 0 | 0 1 0 0 0 1 0 0 |
| 0 0 0 1 1 | 0 0 0 0 0 0 0 0 | 0 0 1 0 1 0 0 0 |
| 0 0 1 0 0 | 0 0 0 0 0 0 0 0 | 0 0 0 1 0 0 0 0 |
| 0 0 1 0 1 | 0 0 0 0 1 0 0 0 | 0 0 1 0 0 0 0 0 |
| 0 0 1 1 0 | 0 0 0 0 0 1 0 0 | 0 1 0 0 0 0 0 0 |
| 0 0 1 1 1 | 0 0 0 0 0 0 1 0 | 1 0 0 0 0 0 0 0 |
| 0 1 0 0 0 | 0 0 0 0 0 0 0 1 | 0 0 0 0 0 0 0 0 |
| 0 1 0 0 1 | 1 0 0 0 0 0 1 0 | 0 0 0 0 0 0 0 0 |
| 0 1 0 1 0 | 0 1 0 0 0 1 0 0 | 0 0 0 0 0 0 0 0 |
| 0 1 0 1 1 | 0 0 1 0 1 0 0 0 | 0 0 0 0 0 0 0 0 |
| 0 1 1 0 0 | 0 0 0 1 0 0 0 0 | 0 0 0 0 0 0 0 0 |
| 0 1 1 0 1 | 0 0 1 0 0 0 0 0 | 0 0 0 0 1 0 0 0 |
| 0 1 1 1 0 | 0 1 0 0 0 0 0 0 | 0 0 0 0 0 1 0 0 |
| 0 1 1 1 1 | 1 0 0 0 0 0 0 0 | 0 0 0 0 0 0 1 0 |

FIG. 7

| MEMORY LOCATION | CONTENTS | |
| --- | --- | --- |
| | ROM 2 | ROM 1 |
| E D C B A | Y8 Y7 Y6 Y5 Y4 Y3 Y2 Y1 | Y8 Y7 Y6 Y5 Y4 Y3 Y2 Y1 |
| 1 0 0 0 0 | 0 0 0 0 0 0 0 0 | 0 0 0 0 0 0 0 1 |
| 1 0 0 0 1 | 0 0 0 0 0 0 0 0 | 0 0 0 1 0 0 0 0 |
| 1 0 0 1 0 | 0 0 0 0 0 0 0 1 | 0 0 0 0 0 0 0 0 |
| 1 0 0 1 1 | 0 0 0 1 0 0 0 0 | 0 0 0 0 0 0 0 0 |
| 1 0 1 0 0 | 0 0 0 0 0 0 0 0 | 0 0 0 0 0 0 0 1 |
| 1 0 1 0 1 | 0 0 0 0 0 0 0 0 | 0 0 0 1 0 0 0 0 |
| 1 0 1 1 0 | 0 0 0 0 0 0 0 1 | 0 0 0 0 0 0 0 0 |
| 1 0 1 1 1 | 0 0 0 1 0 0 0 0 | 0 0 0 0 0 0 0 0 |
| 1 1 0 0 0 | 0 0 0 0 0 0 0 0 | 0 0 0 0 0 0 0 1 |
| 1 1 0 0 1 | 0 0 0 0 0 0 0 0 | 0 0 0 1 0 0 0 0 |
| 1 1 0 1 0 | 0 0 0 0 0 0 0 1 | 0 0 0 0 0 0 0 0 |
| 1 1 0 1 1 | 0 0 0 1 0 0 0 0 | 0 0 0 0 0 0 0 0 |
| 1 1 1 0 0 | 0 0 0 0 0 0 0 0 | 0 0 0 0 0 0 0 1 |
| 1 1 1 0 1 | 0 0 0 0 0 0 0 0 | 0 0 0 1 0 0 0 0 |
| 1 1 1 1 0 | 0 0 0 0 0 0 0 1 | 0 0 0 0 0 0 0 0 |
| 1 1 1 1 1 | 0 0 0 1 0 0 0 0 | 0 0 0 0 0 0 0 0 |

FIG. 8

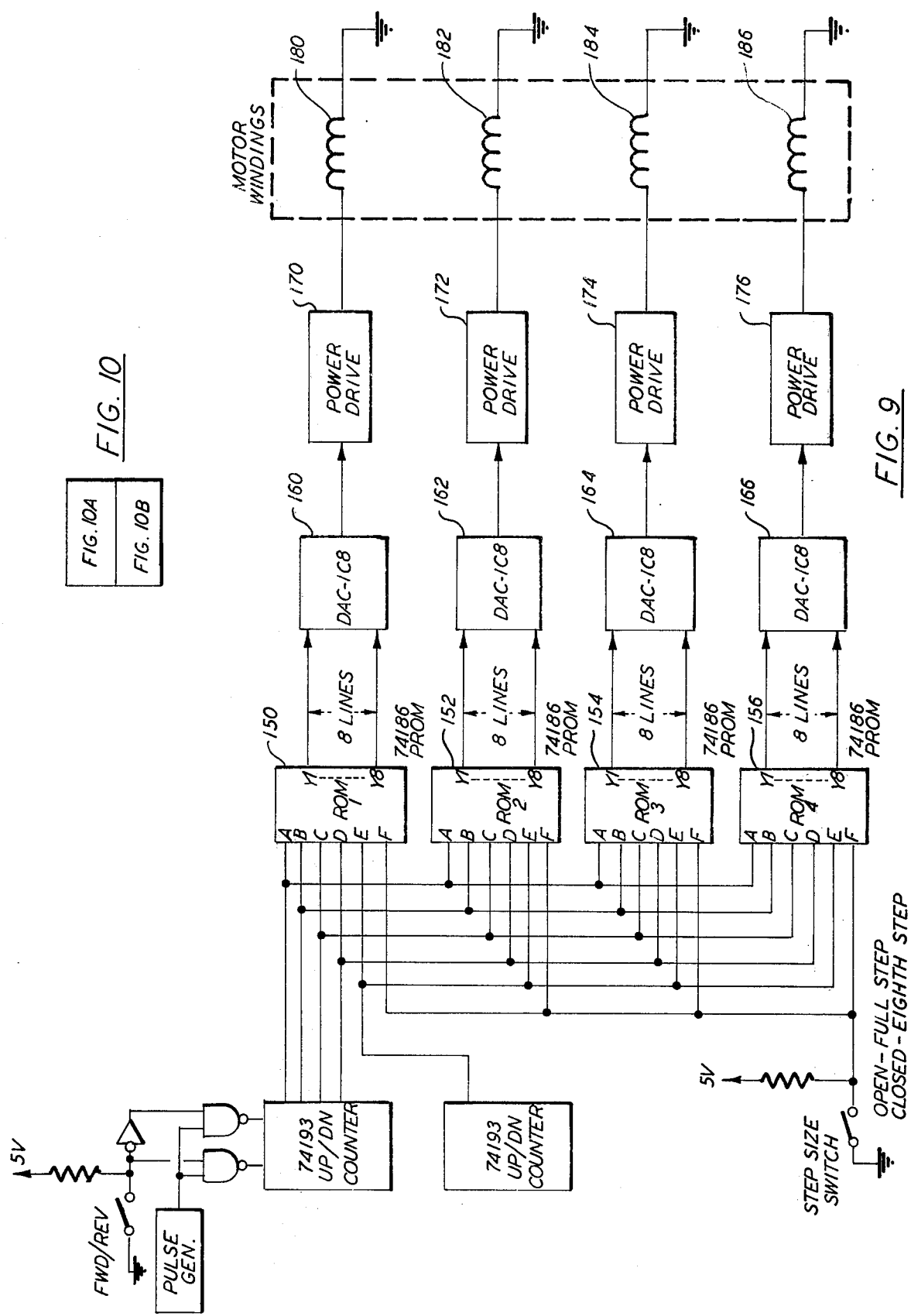

FIG. 10A

DUAL STEPPING ANGLE STEPPER MOTOR DRIVE

BACKGROUND OF THE INVENTION

This invention relates generally to the field of stepping motors and particularly to circuitry for controlling stepping motors of the type having many stator windings wherein the control circuit is operable to selectively vary the step size to produce higher control resolution over the rotor position.

Stepping motors have long been used in numerous applications as a means for controlling the movement of a machine part from one precise position to another precise position. The stepping motor is particularly advantageous for this application because the rotor position is controlled by energizing the windings in a step wise manner and each step causes the rotor to move a specified distance. One such stepping motor is the PD-12, manufactured by A. W. Haydon Co. Products of Cheshire, Conn., a North American Philips Company, which, in its normal mode of operation, has 96 steps per revolution or, each step causes the rotor to turn 3.75°. The PD-12 motor has eight stator windings which are energized in accordance with manufacturer's specifications to produce a 3.75° rotation for each step. This involves successively energizing the windings in a predetermined sequence with usually more than one winding being energized at any given moment of time. The energized windings produce a magnetic force on the rotor which causes it to turn 3.75°. Thereafter, a different set of the eight windings is energized to produce a further 3.75° rotation. Thus, by producing a sequence of unique energizing signals, the rotor position is incrementally advanced or stepped by 3.75° until the pulse source is turned off.

While motors and powering circuits of the type described above are known in the prior art, these motors and control circuits are primarily useful for causing a motor to turn a set distance which correlates to the designed stepping distance for the motor. For example, the above described stepping motor is designed to advance the rotor by 3.75° per step. Other stepping motors, on the other hand, may provide 200 steps per revolution and, therefore, provide 1.8° of rotation for each step. Consequently, by changing the motor, a higher degree of resolution may be achieved provided the new motor has a greater number of steps per revolution.

An alternative approach to producing higher positional resolution with stepping motors is to utilize gears coupled to the rotor. Then, for each step, the geared output steps a distance controlled by the gears.

Generally, electronic stepping motor control circuits for stepping motors of the type described above consist of power output stages controlled by appropriate switching logic. Successive pulses produced by a pulse generator are converted to control the sequence of energizing current for the stator coils thereby causing the stepping action of the motor. Although a given stepping motor possesses a fixed number of step positions, a stepping size other than that of the original design can be achieved by selecting different stator winding excitation combinations. The circuits for accomplishing this, however, are generally quite complicated and are of a type which operate the motor in a selected manner. Circuitry for operating a motor in more than one sales table mode is usually more complex. Attempts to combine circuits which make a motor operable in one mode with circuits to control the motor in another mode have proved impractical and, consequently in order to provide more than one mode, parallel circuits are generally provided with a switching arrangement to switch the desired control circuit into operation. Due to much circuit duplication, this later approach is too costly to achieve wide commercial acceptance.

In view of the foregoing difficulties with stepping motor control circuits, it is a principle object of the present invention to provide a stepping motor control circuit capable of selectively operating a stepping motor in more than one mode of operation without requiring highly complex and costly electronic circuitry to do so.

It is still a further objective of the invention to provide a stepping motor control circuit which is selectively operative to control a motor in one of several modes of operation and yet is easily switched between the modes of operation.

It is still a further objective of the invention to provide a practical stepping motor control circuit permitting operation in a high resolution mode while permitting switching to a high speed mode of operation.

BRIEF DESCRIPTION OF THE INVENTION

In achieving the foregoing and other objects of the invention, the control circuit according to the present invention utilizes an inexpensive and easily programmed read-only-storage device for controlling the winding energizing sequence of a stepping motor. The read-only-memory device is addressed by circuitry including a switch or the like for selecting the motor direction, i.e., either forward or reverse, and an up-/down counter which counts pulses from a pulse generator in the up direction when the switch is set to forward and in the down direction when the switch is set to reverse. The counter output comprises part of the address for the read-only-memory. The remainder of the address is derived from one or more selector switches or logic circuits which are set by the operator to the selected motor step size. In its simplest form, this switching arrangement permits selecting either full step mode or some other stepping mode such as half step mode.

Depending on the selected step size, each pulse received from the pulse generator by the counter produces an output having a periodically repeating cumulative count correlating to the total number of pulses counted by the pulse generator. This cumulative count is applied to the addressing circuitry of a read-only-memory to comprise part of the desired address with the step size selector comprising the remainder of the address. The read-only-memory output comprises signals representative of the data stored at the addressed location which is used to control the motor winding or windings which is energized. By specifying the contents of the read-only-memory properly, a winding energizing sequence is produced by the circuitry coupled to the read-only-memory for stepping the motor at a rate corresponding to the pulse rate of the pulse generator and a step size indicated by the step size selector in a direction indicated by the direction selector.

BRIEF DESCRIPTION OF THE DRAWINGS

The foregoing objects, advantages and features of the invention are described below in greater detail in connection with the drawings wherein:

FIGS. 3a and 3b respectively show the memory location and contents and the coil energizing sequence produced thereby for the circuitry of FIG. 2 when the step size selector is set to full-step mode;

FIG. 7 is the data required in the read-only-memory of FIG. 5 to operate the stepping motor in one quarter step mode; and FIG. 8 is the data required in the read-only-memory of FIG. 5 to operate the stepping motor of FIG. 5 in full step mode.

FIG. 9 shows an alternative embodiment of the invention;

DETAILED DESCRIPTION

Figure 1:
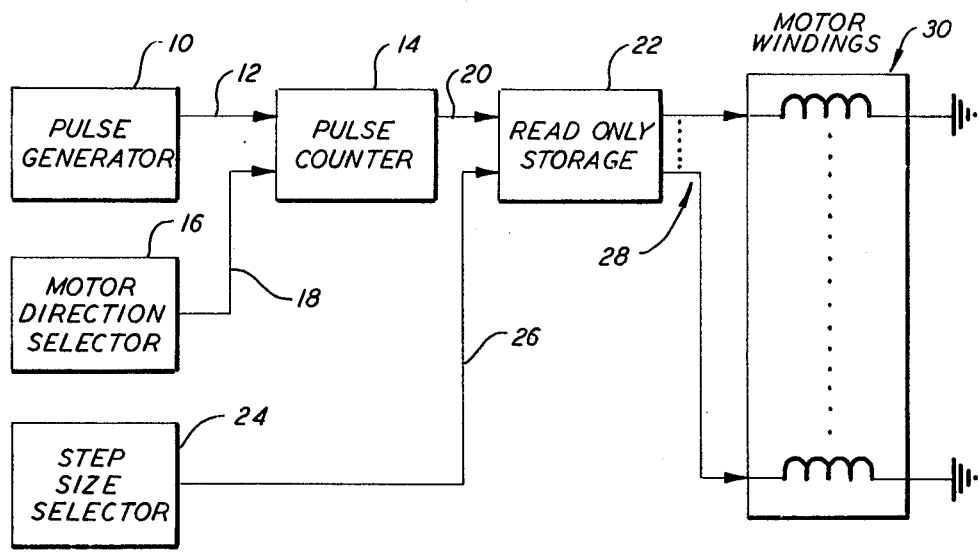
FIG. 1 comprises a block diagram of the motor control system according to the present invention.

A block diagram of the stepping motor control circuit of the present invention is shown in FIG. 1 and includes a pulse generator 10 which may comprise a square wave generator or the like for producing pulses on a wire 12 coupled between the pulse generator 10 and a pulse counter 14. The generator 10 can be of any type which will produce pulses at a selectable pulse rate that can be counted by the pulse counter 14. The pulse rate is selected to be compatible with the stepping motor controlled by the circuitry and for a PD-12 motor the maximum pull-in rate is typically 1kHz.

A motor direction selector 16 is coupled via a wire 18 to the pulse counter 14. The signal transmitted over the wire 18 indicates the motor direction selected by the operator. In its simplest form, the motor direction selector 16 comprises a switch for providing either a high logic level or a low logic level on the wire 18 depending on whether the switch is respectively open or closed circuited to ground for selecting respectively forward or reverse direction.

The pulse counter 14 is typically a pulse counter circuit which is operative to count pulses on the wire 12 in a direction indicated by the signal level on the wire 18. Such counter circuits are typically known as up-/down counters and, in the circuit of FIG. 1, such a counter will count up for one selected motor direction and count down for the other selected motor direction.

The pulse counter 14 provides a repeating pulse count on an output bus 20 containing more than one wire. As described below in greater detail, the preferred embodiment of the present invention includes four wires in the bus 20 so that 16 different signal combinations are transmitted over the bus 20 to a read-only-memory unit 22. The information on the bus 20, as described more fully below, comprises part of the address for selecting a location in the read-only-storage 22.

A step size selector 24 is coupled via a wire 26 to the read-only-memory 22. The step size selector in its simplest form is a switch or the like which is set by the operator to select the motor step size although multi-position switches and/or logic may be used to provide step size indicating signals to specify more than two selected step sizes. The electrical signal from the step size selector 24 indicates the selected step size and is transmitted over the wire 26 to the read-only-memory 22. The selected step size comprises a further portion of the address for a desired read-only-memory location.

The read-only-memory 22 has an output comprising a plurality of lines, indicated generally at 28, where each output is coupled to an individual motor winding indicated generally at 30. When an address is formed by signals on the bus 20 and the wire 26, the read-only-memory 22 presents the predefined data stored at the addressed location on the output lines 28. Each of the lines 28 preferably includes a power amplifier (not shown) to drive the motor winding coupled thereto as most read-only-memory output drive circuits do not have sufficient drive capability to power a motor winding by itself. The predefined data is coupled via the power amplifiers to the motor windings 30 to energize them or not, depending on the data content of the bit position within the read-only-memory location addressed which is coupled to each motor winding.

As indicated below in greater detail, the read-only-memory 22 is usually not coupled directly to the motor windings 30 but is usually coupled thereto via a driver circuit so as to provide energizing current for the motor winding.

In operation, the circuit of FIG. 1 is operative to drive a motor having windings 30 in the following manner. The operator selects the desired motor direction on the motor direction selector 16 and the step size is selected via the step size selector 24. When the pulse generator 10 is turned on and coupled to the pulse counter 14, the pulse counter counts these pulses in a direction indicated by the signal on the wire 18 from the motor direction selector 16. The pulse count is then transmitted from the counter 20 to the read-only-memory 22. The step size indication on the wire 26 in combination with the pulse count on the bus 20 is operative to address the read-only-memory 22 which, for each address formed, produces winding energizing signals on the output lines 28 which couple to the windings 30 of the stepping motor. Since the address to the read-only-memory 22 changes every time the pulse counter 14 is updated, the energizing pattern on the output lines 28 changes to that specified by the data at the newly addressed location. Consequently, the motor stepping rate is determined by the pulse generator 10. As will be more completely described below, the motor step size is determined by the step size selector 24 which controls in part the read-only-memory locations that are addressed each time a given pulse counter output is presented to the read-only-memory 22 via the bus 20 thereby permitting the energized windings to change in a periodic sequence which causes the motor to turn by a desired amount for each step.

Figure 2:
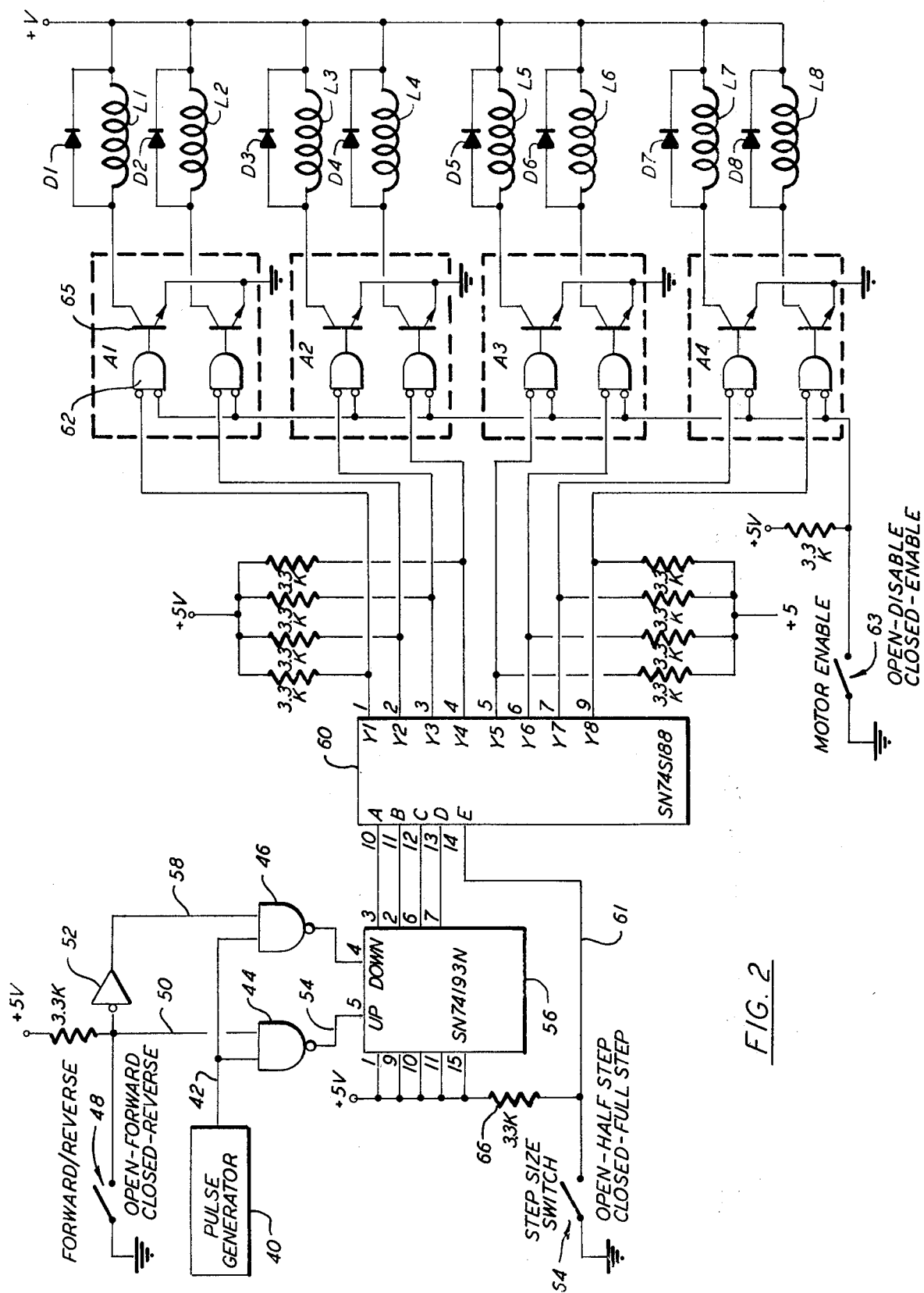
FIG. 2 is a detailed circuit diagram for the system shown in FIG. 1.

One specific circuit arrangement for implementing the schematic diagram of the invention in FIG. 1 is shown in FIG. 2 and includes a pulse generator 40 which may be a variable rate square wave generator or the like which may operate at a selectable frequency. The pulses produced by the generator 40 are transmitted over a wire 42 to one input of each NAND gate 44 and 46.

The motor direction selector in FIG. 2 comprises a forward/reverse switch 48 which is open circuited to indicate forward direction and close circuited to indicate reverse direction. One switch contact is grounded while the other contact connects via the wire 50 to the second input of a NAND gate 44. The same switch 48 contact is also coupled via an inverter circuit 52 to the other input to NAND gate 46. In this manner, when the forward/reverse switch 48 is closed circuited, a ground connection is coupled via the wire 50 to one input of NAND gate 44. Accordingly, the output of NAND gate 44 which is coupled to wire 54 is always a high logic level. Since the wire 54 couples to the up input of an up/down counter 56, the counter 56 is inoperative in the up direction when the switch 48 is closed.

On the other hand, when the switch 48 is closed, the inverter circuit 52 places a high level signal on its output 58 which comprises one input to the NAND gate 46. Thereafter, when a pulse at a high logic level appears on the output line 42, the NAND gate 46 pulses from a high to a low logic level which is applied to the down input of the up/down counter 56. This causes the counter 56 to count down by one for each pulse received at the input to the NAND gate 46 from line 42 when the signal on line 58 is high.

When the switch 48 is open, on the other hand, the voltage on the line 50 is a high logic level and is applied to one input of NAND gate 44. The high logic level is inverted by the inverter 52 to place a low logic level signal on the line 58 thereby blocking NAND gate 46. When a pulse appears on line 42, however, both inputs to NAND gate 44 are high thereby causing its output on line 54 to go low thereby causing the counter 56 to count up by one for each pulse from a high to a low level appearing at the NAND gate 44 output. Accordingly, the forward/reverse switch 48 in combination with the circuitry between switch 48 and the up/down counter 56 is operative to control whether the counter 56 counts up (when the switch 48 is open) or counts down (when switch 48 is closed).

In the preferred embodiment according to FIG. 2, the up/down counter 56 comprises a Texas Instruments SN74193N up/down counter which has four output terminals, however, other up/down counters may be used. The signals appearing at these four output terminals are either logic high or logic low with the assigned binary representation being respectively "1" and "0". As indicated earlier, the binary output from the counter 56 comprises part of the address for a read-only-memory device 60. The remaining address input to the read-only-memory 60 couples via a wire 61 to a step size switch 64 and a pull-up resistor 66. When the switch 64 is open, the voltage on the wire 61 is pulled up by the connection provided by the pull-up resistor 66 between the wire 61 and the 5 volt power supply. Accordingly, the binary representation for the signal applied to input pin 14 of read-only-memory 60 is "1" when switch 64 is open. In the discussion that follows, whenever switch 64 is open, by definition, the selected step size is "half step" and "full step" when switch 64 is closed. As will become clearer later, however, the function switch 64 is merely to address one portion of the read-only-memory 60 as opposed to another portion and, consequently, other means to select different read-only-memory segments may be utilized as well.

When switch 64 is closed, the voltage on the line 62 is zero as the line is shorted to ground by the switch 64. Accordingly, a binary "0" is associated with the address at pin 14 of the read-only-memory 60. This is operative to address the other portion of the storage 60.

In the preferred embodiment of the invention, the read-only-memory 60 comprises a Texas Instruments SN74S188 which has eight output lines and the signal level on these lines comprises a binary combination of signals which is utilized as hereinafter described in greater detail. Data is placed into this read-only-memory by a method specified by the manufacturer. The signals appearing at output pins of the read-only-memory 60, however, are operative, when at a low level, to produce an energizing current through the windings L1–L8 which is coupled thereto. When a high level signal appears at one of the output pins of read-only-memory 60, the motor winding L1–L8 coupled thereto has no energizing current passing through it.

Each of the output terminals of read-only-memory 60 is coupled via a 3.3 K resistor to plus 5 volts. These resistors are used to pull the voltage high at each output terminal of the read-only-memory 60 whenever the data at the addressed storage location is "0". Whenever the data at a given addressed storage location is "0", however, the voltage at the corresponding output terminal Y1–Y8 of read-only-memory 60 is approximately zero volts which, as described below in greater detail, is operative to cause energizing current to flow through the particular motor winding coupled thereto.

Each output terminal in Y1–Y8 of the read-only-memory 60 is coupled to one input terminal of a negated input AND gate whose other input is connected via an enable switch 63 to ground. For example, output terminal 1 of read-only-memory 60 is connected to one input of negated input AND gate 62 which itself comprises a portion in the preferred embodiment of the invention, of a DS3313 driver circuit which comprises two negated input AND gates each coupled to a driver transistor which is utilized, in the circuit of FIG. 2, to couple an energizing current through a motor winding.

In operation, the negated input AND gate 62 couples a driving signal to the base of transistor 65 whenever output pin 1 from the read-only-memory 60 is low. The transistor 65 conducts current through the motor winding L1 so long as the signal at output pin 1 of the read-only-memory 60 is low which, as indicated above, corresponds to a binary "1" at the Y1 bit position for the word addressed by the signals appearing at address pins 10, 11, 12, 13, and 14. On the other hand, when the output voltage at terminal 1 of the read-only-storage 60 is high indicating a "0" in the Y1 bit position of the addressed position, the negated input AND gate 62 is disabled so as to place a low voltage on the base of transistor 64 thereby preventing current through the motor winding L1.

A corresponding analysis may be made for each of the circuits coupled to the motor windings L2, L3, L4, L5, L6, L7 and L8.

Each of the motor windings L1–L8 is shunted respectively by a diode D1–D8. These diodes D1–D8 are provided to prevent a voltage buildup across the transistor coupled thereto when the magnetic field through that particular winding decays when the transistor coupled thereto is turned off. Protective diodes of this sort are well-known in the art and those skilled in the motor arts are familiar with many specific diodes which may be used for this purpose.

Referring now to FIGS. 3a and 3b, the read-only-memory 60 of FIG. 2 includes the data shown in FIG. 3a at the locations whose address is listed in the left column. The data is stored at the indicated locations in accordance with manufacturers instructions. For example, for address location zero, the read-only-memory 60 contents is operative to produce a low level signal at output terminals 1, 6, 7 and 9 because a logic 1 is found at bit positions Y1, Y6, Y7 and Y8 for the word at location 0. Accordingly, the L1, L6, L7 and L8 windings are energized and the remaining windings are not energized. When the counter 56 in FIG. 2 is incremented by a pulse to a value of one, the read-only-memory 60 changes its output to correspond to the data stored at location 1 so that an energizing current is applied to the windings L1, L2, L7 and L8 because bits Y1, Y2, Y7 and Y8 are 1 at location 1. When the counter 56 is incremented yet another time, the read-only-memory 60 is operative to produce an energizing current through windings L1, L2, L3 and L8 because bit positions Y1, Y2, Y3, and Y8 are "1" at location 2. Accordingly, the coil energizing sequence shown in FIG. 3b is developed when the counter is either counted up or down and the switch 64 is closed. This energizing sequence is suitable for PD-12 stepping motors to cause it to rotate at a rate of one step or 3.75° for each pulse produced by the pulse generator 40.

Figures 4A, 4B:
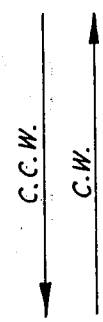
FIGS. 4a and 4b respectively show the read-only-memory location and content and the coil energizing sequence produced thereby for the circuitry of FIG. 2 when the step size selector set to ½ step mode.

When the operator selects half-step mode, however, a different coil energizing sequence is desired so as to produce 1.875° rotation for each step. This is accomplished by providing a different set of data stored within the read-only-memory 60 for controlling the motor in half-step mode. Since the step size switch 64 comprises part of the mechanism for addressing the read-only-memory 60, a different area of the storage is addressed when the binary signal at input pin 14 is "1" than when it is "0". The data shown in FIG. 4a is the data which is stored in the read-only-memory 60 in order to produce the desired half-step mode of operation. For example, when the counter 56 is a zero and the switch 64 is open, the read-only-memory 60 is operative to address location 16 which has the same information stored therein as is stored at location 0. Accordingly, an energizing current passes through windings L1, L6, L7 and L8 for the period of time for one cycle from the pulse generator 40. When the counter 56 is incremented by one, however, to address memory location 17, information is stored therein for energizing motor windings L1, L7 and L8. Accordingly, only three windings are energized during the period of time when the counter 56 is at a value of one and the switch 64 is open. On further incrementing the counter 56 to two, memory location 18 is addressed and windings L1, L2, L7 and L8 are energized. Similar results occur when the counter 56 counts down. Accordingly, as the counter 56 is stepped either while the apparatus is in half-step mode, the number of motor windings which are energized at a given moment of time is either three of four depending on the exact count to which the counter 56 is set. This arrangement produces a coil energizing sequence shown in FIG. 4b which, it can be shown, is operative to cause the motor to step by one half the number of degrees for each pulse received from the pulse generator 40 that is produced when the switch 64 is closed and a sequence such as shown in FIG. 3b is generated.

Figure 5:
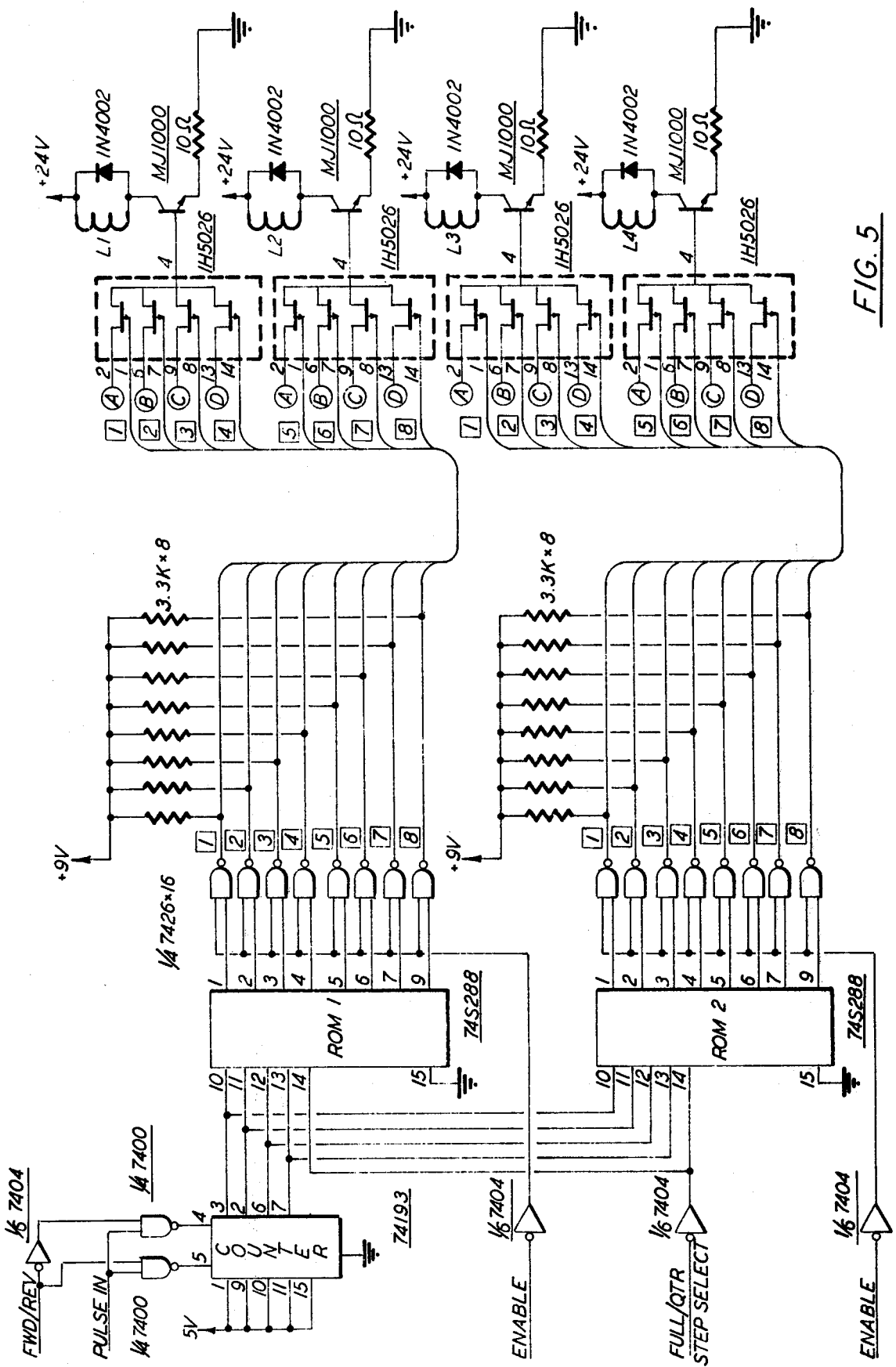
FIG. 5 is a circuit operative according to the principles of the invention for controlling a stepping motor in either full or one quarter step mode.

While the foregoing description has emphasized a circuit capable of producing a coil energizing sequence for stepping a stepping motor by either a full step or by a half step, those of skill in the art will readily recognize that the principles of the invention are applicable to other circuit arrangements where the desired motor step is other than either a full or one half step. For example, the circuit of FIG. 5 may be utilized with a stepping motor such as a Computer Devices Corporation model 15RS-03 which is a four winding stepping motor. With modification, the circuit of FIG. 5 could operate selectively in full, half or quarter step mode. The windings of the circuit in FIG. 5 can be energized with the read-only-memory data shown in FIG. 7 and the voltages produced by the reference voltage supply of FIG. 6 to produce a stepping rate of one quarter that of the rate achieved when the circuitry of FIG. 5 is energized in accordance with the data in the read-only-memory is shown in FIG. 8. According to the circuitry of FIG. 5 and the data of FIG. 7, during the first step, the winding L1 is energized via the FET coupled to terminal A and the maximum available energizing current from the power supply of FIG. 6 passes therethrough. During the second step, however, both winding L1 and winding L2 are energized with winding L1 being powered by the FET coupled to terminal B and winding L2 energized via the FET coupled to terminal D. During the third step, winding L1 and L2 are again energized with the winding L1 being energized via the FET coupled to terminal C and the winding L2 being energized via the FET coupled to terminal C as well. During step four, the winding L2 is energized via the FET coupled to terminal A. In this manner, it can be demonstrated that the stepping motor, if it is not overloaded, will produce an angular shift of the rotor during the stepping sequence produced by the data of FIG. 7 of one quarter the step produced when the motor is driven by a full step energizing current.

The circuitry of FIG. 5 is operated in full step mode when the windings are energized according to the data shown in FIG. 8. During the first step, motor winding L1 is energized via the FET coupled between the transistor which drives motor winding L1 and the terminal A in FIG. 6. During the second step, the motor winding L2 is energized via the transistor in series with motor winding L2 and driven by the FET which couples to terminal A of FIG. 6. During the third step, motor winding L3 is energized by a transistor in series with motor winding L3 and controlled by the FET coupled to terminal A of FIG. 6. The fourth step energizes motor winding L4 by the transistor coupled in series with the winding L4 which is controlled by the FET that couples to terminal A of FIG. 6. Each subsequent step is a repeat of one of the first four steps.

Figure 6:
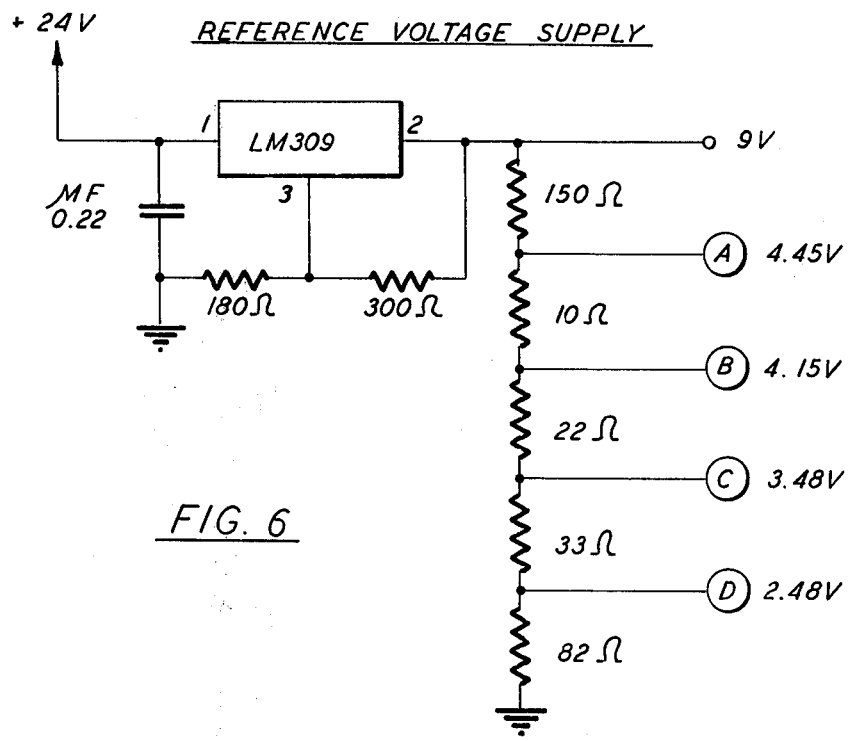
FIG. 6 is a reference voltage supply for the driver circuits of FIG. 5.

The power supply of FIG. 6 is illustrative of one approach for producing the output voltages for one quarter step operation. The voltages are selected by the circuit designer to provide the required current in the motor windings to turn the rotor by one quarter step. To accomplish this, the designer must determine the required current in the motor windings for each step and then produce a power supply such as shown in FIG. 6 to power the motor drive circuits to produce the desired current. Each such step may require energizing more than one motor winding and the read-only-memory output is operative to gate the power supply voltage from the circuit of FIG. 6 to the motor windings of FIG. 5 to accomplish the desired motor stepping.

An alternative approach involves using the read-only-memory output to control digital to analog converters which, in turn, power the motor windings to produce the desired current to rotate the rotor by the desired step size. FIG. 9 shows such an alternative embodiment of the invention. The principal difference between this embodiment and those described earlier is that the read-only-memories 150, 152, 154 and 156 couple respectively to a digital to analog converter (DAC) 160. The digital input to the DAC's is in the form of binary signals on the 8 output lines from each read-only-memory 150, 152, 154, 156. This data from the memories is previously selected to perform the desired step wise advancing of the motor. Each DAC 160, 162, 164 and 166 responds to the digital data input thereto by placing a corresponding voltage onto its output which couples respectively to a power drive 170, 172, 174, 176. The power drive amplifies the analog voltage input thereto and the amplified signal powers one of the motor windings 180, 182, 184 and 186. As with earlier described embodiments, one or more of the motor windings 180, 182, 184 and 186 may receive power at a given instant in time and the powered windings are selected to produce the desired stepping movement for the motor.

Figure 10A:
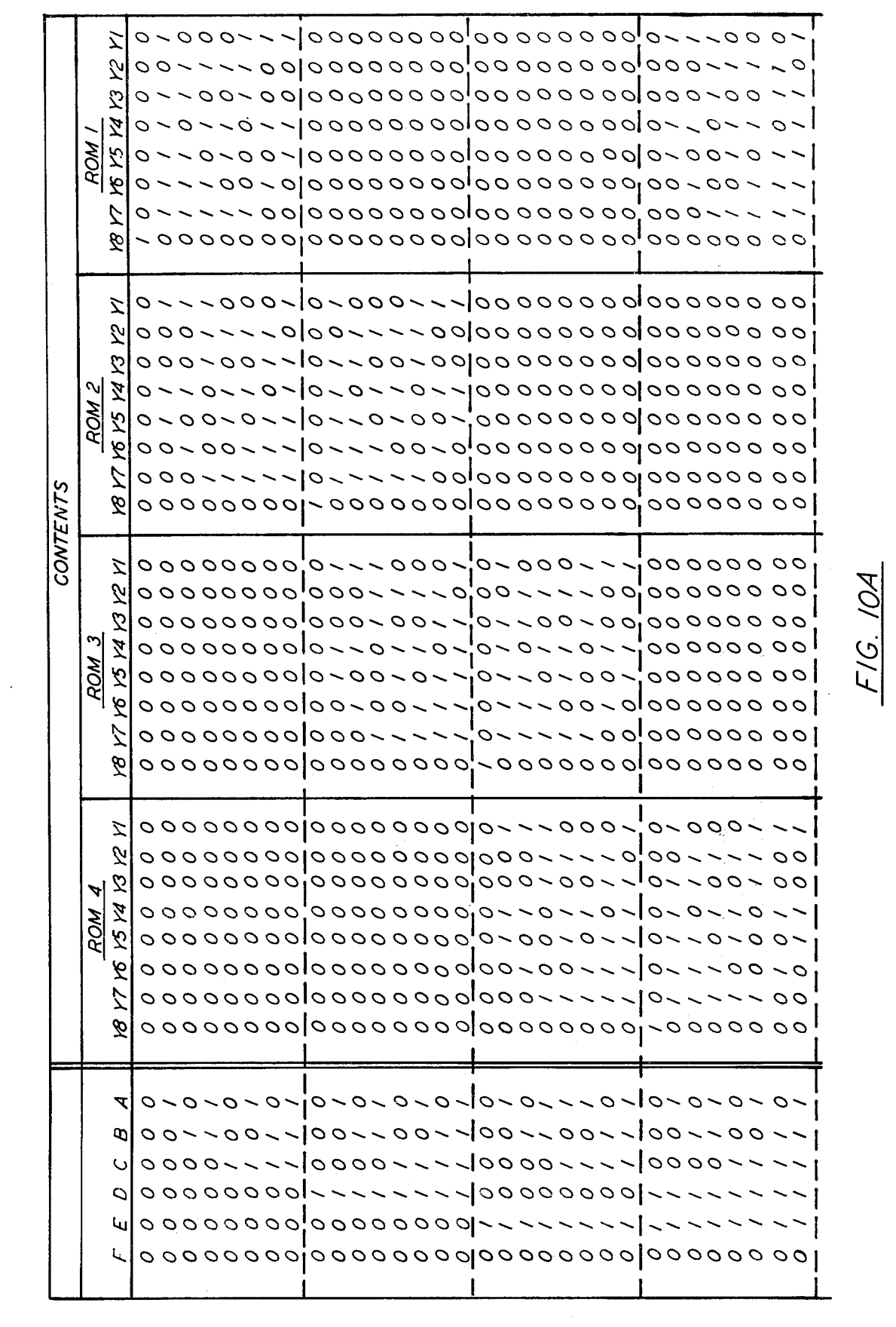
Figure 10B:
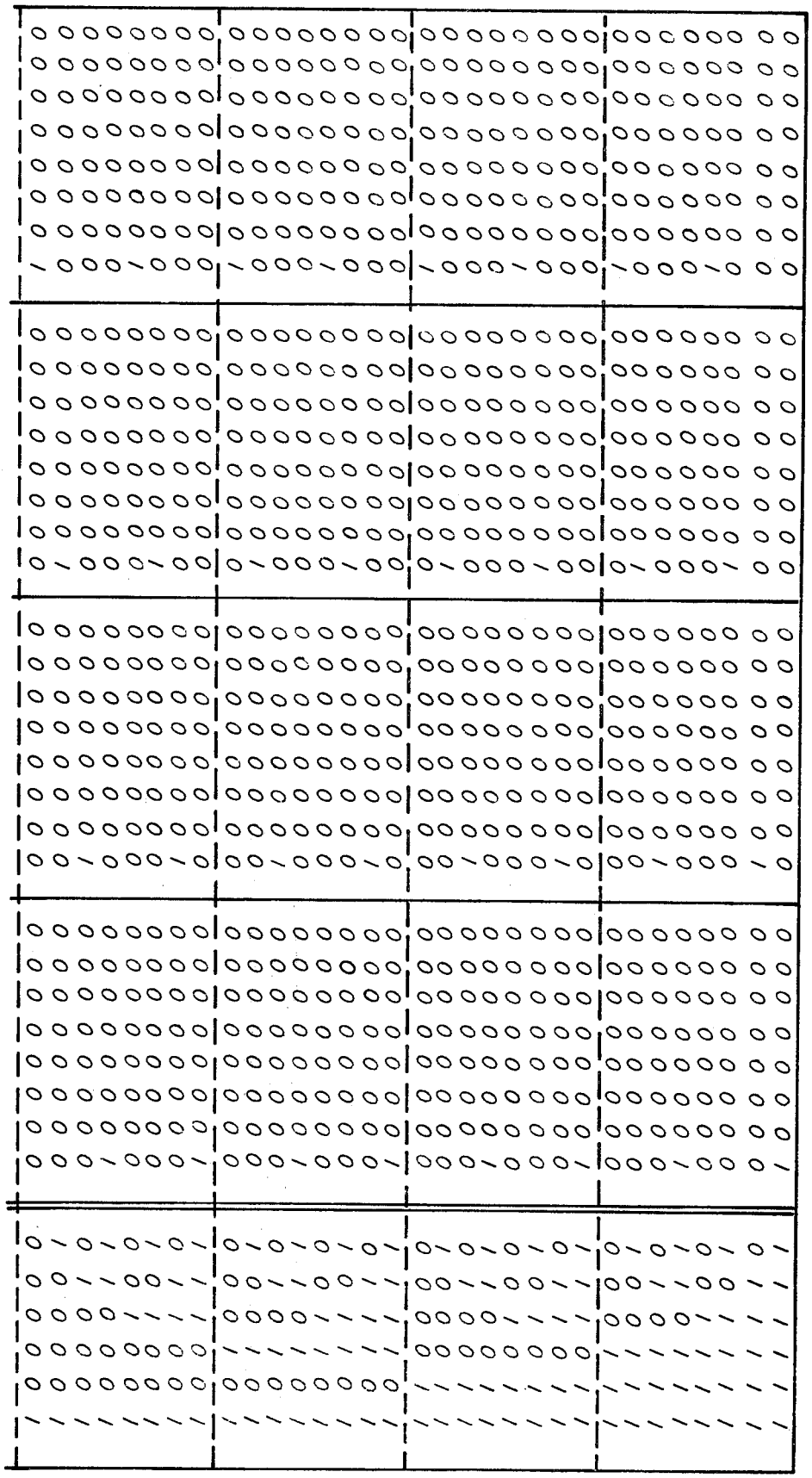
FIG. 10 shows how the tables of FIGS. 10A and 10B fit together.

FIG. 10 schematically shows how the table of FIG. 10a and 10b fit together. FIG. 10a shows the data required and the address for the required data for read-only-memories 150, 152, 154 and 156 when the motor is operated in one-eighth step mode. FIG. 10b shows the read-only-memory data and its location for single step mode for the circuit of FIG. 9. In accord with the principals of the invention, the data in the read-only-memories may be changed from that shown in FIG. 10 thereby producing a different operation of the motor if such operation is desired.

From the foregoing analysis of the present invention, those of skill in the art will readily recognize that the invention is applicable to numerous other stepping motor control arrangements which have not been described. For example, the description has been limited to controlling a stepping motor such that each step comprises either a "full", a "half", or a "quarter step". Those skilled in the art, however, will readily recognize that the principles of the invention might easily be applied where the desired motor control circuit would be operative to produce one-eighth steps. This modification, however, may require further reference voltage supplies of the type shown in FIG. 6 or a digital-to-analog converter and additionally may require a larger read-only-memory configured in a manner similar to that shown in FIG. 5 and programmed with appropriate data. In addition, the skilled stepping motor control circuit designer will recognize that the motor control circuit may be operated in a manner permitting selection of more than two different stepping modes of operation provided that sufficient read-only-memory size is available and auxiliary circuitry is operative to select that portion of the read-only-memory required for controlling the energizing of the motor windings to accomplish the desired step size control.

The foregoing and other modifications of the embodiment described above may be made by those skilled in the art to which the invention pertains without departing from the spirit and scope of the invention as defined in the claims.

What is claimed is:

1. A stepping motor control circuit for selectively controlling the size of each step of a controlled stepping motor with a plurality of windings comprising, in combination:
    means selectively operable to produce step size indicating signals;
    means to produce periodically repeating address signals where the signals change at the desired motor step rate;
    read-only-memory means for storing predefined data which is changeable to suit the desired operation for the stepping motor at each of a plurality of addressable locations, said read-only-memory means being responsive to said step size indicating signals and said address signals to place the predefined data stored at the address defined by said step size indicating signals and said address signals onto the memory output terminals;
    motor drive circuit means responsive to the predefined data at said memory output terminals to energize the motor windings specified by said data at said output terminals thus causing the motor to turn by a step whose size is indicated by the step size indicating signals.

2. The stepping motor control circuit of claim 1 additionally including a motor direction selector for controlling the direction said repeating address signals change so that said read-only-memory address either increases or decreases.

3. The stepping motor control circuit of claim 1 wherein said address signals producing means comprises a pulse generator and a pulse counter to count pulses produced thereby, the count in said counter produces said address signals.

4. The stepping motor control circuit of claim 2 wherein said address signals producing means comprises a pulse generator and a pulse counter responsive to said pulse generator and said motor direction selector, said pulse counter counts in a direction corresponding to the selected motor direction.

5. The stepping motor control circuit of claim 1 wherein said address signals producing means produces at least as many unique address signals as there are winding energizing combinations for stepping the motor by the step size indicated by said step size indicating signals.

6. The stepping motor circuit of claim 1 wherein said means to produce step size indicating signals is selectively operable to produce one of a plurality of selectable step size indicating signals.

7. A stepping motor control circuit for controlling the operation of a multi-winding stepping motor comprising, in combination:
    means to produce periodically repeating address signals where the signals change at the desired motor step rate;
    read-only-memory means for storing predefined data which is changeable to suit the desired operation of the stepping motor at each of a plurality of addressable locations within said storage, said read-only-memory means being responsive to said address signals to place the predefined data stored at the location defined by said address signals onto the output terminals of said read-only-memory;
    motor drive circuit means responsive to said predefined data on said output terminals to energize at least one motor winding in accordance with the predetermined data at said output terminals.

8. The stepping motor control circuit of claim 7 wherein said address signal producing means includes a counter operative to produce said address signals wherein said counter selectively changes either in an upward or a downward direction.

9. The stepping motor control circuit of claim 8 wherein said counter is a binary counter circuit with n bit positions where the count repeats every $2^n$ changes of said counter.

10. A stepping motor control circuit for controlling a stepping motor with a plurality of windings comprising, in combination:
- a pulse generator to produce a string of pulses, each pulse for stepping the motor by one step;
- a step size selector to produce a step size indicating signal to indicate the selected motor step size;
- motor direction selector means;
- a pulse counter responsive to said pulse generator and said motor direction selector for producing a periodically repeating pulse count which either steps in an increasing or decreasing direction depending on the selected motor direction for each pulse from said pulse generator;
- read-only-memory addressable by said step size indication signal and said pulse count in said counter to access data which is changeable depending on the desired operation of the stepping motor from the address location, the data being indicative of the windings which are to be energized for each combination of said step size indicating signal and said repetitive pulse count;
- means responsive to said access data to energize at least one said winding specified by said access data.

11. The stepping motor control circuit of claim 10 wherein said pulse generator is adjustable so as to produce pulses at a selectable pulse rate which corresponds to the motor step rate.

12. The stepping motor control circuit of claim 10 wherein said motor direction selector comprises a switch to provide one signal for one direction and another signal for the opposite direction.

13. The stepping motor control circuit of claim 10 wherein said step size selector comprises means to produce selectively at least two step size indication signals.

14. The stepping motor control circuit of claim 10 wherein said pulse counter is a binary pulse up/down counter with the count direction being controlled by said motor direction selector means.

15. The stepping motor control circuit of claim 10 wherein said read-only-memory contains preselected data so that each time a location is addressed, the data at the output terminals corresponds to the preselected data at the addressed location wherein each preselected data word identifies the motor windings which are to be energized to step the motor and move its rotor a distance corresponding to a step from the previous rotor position.

* * * * *